United States Patent
Bonhoure

[19]

[11] Patent Number: 6,157,293

[45] Date of Patent: Dec. 5, 2000

[54] DEVICE FOR DETECTING THE INTRUSION OF A BODY IN A PREDETERMINED SPACE

[75] Inventor: Francis Bonhoure, La Salvetat St Gilles, France

[73] Assignee: Siemens Automotive S. A., Toulouse-Cedex, France

[21] Appl. No.: 09/284,145

[22] PCT Filed: Oct. 2, 1997

[86] PCT No.: PCT/EP97/05442

§ 371 Date: Apr. 7, 1999

§ 102(e) Date: Apr. 7, 1999

[87] PCT Pub. No.: WO98/15930

PCT Pub. Date: Apr. 16, 1998

[30] Foreign Application Priority Data

Oct. 7, 1996 [FR] France .................................. 96 12192

[51] Int. Cl.$^7$ .................................................. B60R 25/10
[52] U.S. Cl. ........................ 340/426; 340/541; 340/540; 307/10.2; 367/93; 367/94; 367/103; 367/104; 342/27; 342/28
[58] Field of Search ............................... 340/426, 425.5, 340/541, 540, 554, 565, 561, 566; 307/10.2; 367/93, 94, 904, 103–105; 342/27, 28

[56] References Cited

U.S. PATENT DOCUMENTS

| 4,565,996 | 1/1986 | Close | 340/572 |
|---|---|---|---|
| 4,618,948 | 10/1986 | Sakakibara et al. | 367/104 |
| 4,661,936 | 4/1987 | Magee et al. | 367/94 |
| 5,438,247 | 8/1995 | Kim et al. | 318/696 |

FOREIGN PATENT DOCUMENTS

| 0 293 004 A2 | 11/1988 | European Pat. Off. . |
|---|---|---|
| 0 368 303 A2 | 5/1990 | European Pat. Off. . |
| 30 03 887 A1 | 8/1981 | Germany . |

OTHER PUBLICATIONS

International Publication No. WO 92/02831 (Müller et al.), dated Feb. 20, 1992.

Patent Abstracts of Japan No. 60–209348 (Yasunori), dated Oct. 21, 1985.

*Primary Examiner*—Julie Lieu
*Attorney, Agent, or Firm*—Herbert L. Lerner; Laurence A. Greenberg; Werner H. Stemer

[57] ABSTRACT

The device comprises a transmitter (7) transmitting ultrasound into a predetermined space (5), a sensor (8) which senses the echoes from the transmission by the transmitter into the space in order to deliver a signal representative of the echoes, and electronic device for processing the signal in order to diagnose the possible presence of a moving body in the space (5). It further comprises a) device (10) for scanning the space (5) with the ultrasound beam output by the transmitter (7) and (b) device (11) for simultaneously moving the echo sensor (8) so as to optimize the signal/noise ratio of the output of the sensor (8).

10 Claims, 1 Drawing Sheet

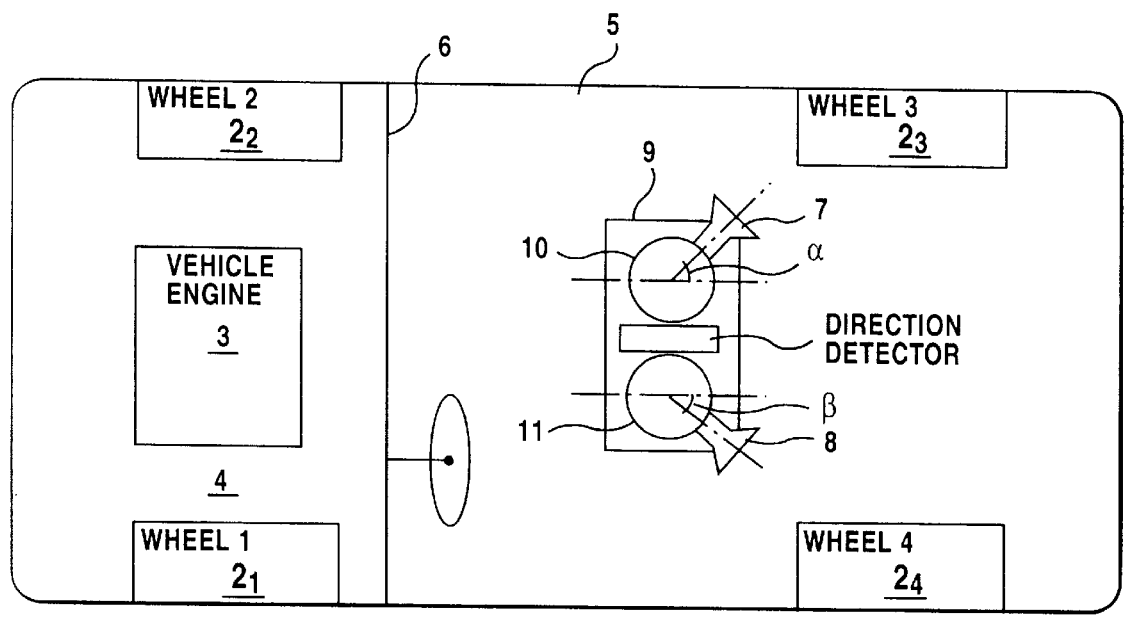

DEVICE FOR DETECTING THE INTRUSION OF A BODY IN A PREDETERMINED SPACE

BACKGROUND OF THE INVENTION

FIELD OF THE INVENTION

The present invention relates to a device for detecting the intrusion of a body into a predetermined space and, more particularly, to a device of this type comprising a transmitter transmitting ultrasound into said space, a sensor which senses the echoes from the transmission by the transmitter into said space in order to deliver a signal representative of said echoes, and electronic means for processing said signal in order to diagnose the possible presence of a moving body in said space.

Such devices are known, designed in particular to trigger an alarm following detection of unauthorized intrusion into a space such as the interior of an automobile vehicle, for example. This is a situation encountered, in particular, when a thief enters by breaking into this interior.

In known detection devices, the ultrasound transmitter and the echo sensor are both mounted in fixed positions, inside the interior. In order to cover the entire volume of this interior optimally, it is then necessary to fix this transmitter and this sensor in positions of compromise between various positions which each provide optimum coverage of only a part of this volume. The result of this compromise is that certain parts are not monitored optimally. Designers are then forced either to focus the monitoring on particularly sensitive regions (that of the steering wheel, the car radio, the glove box, for example) to the detriment of others, or to increase the number of the transmitter/sensor pairs installed in the interior, which solution has the drawback of being expensive.

Further, document EP 0 293 004 discloses an ultrasonic detection device comprising a transmitter and a receiver which are fixed relative to one another, interacting with a turning reflector placed on the transmitter/receiver axis. Although it allows scanning of the plane perpendicular to this axis, such a device involves a moving reflector which is difficult and expensive to produce and adjust, and only allows those echoes produced on surfaces normal to the axis of the incident beam to be returned to the receiver. This limitation makes it problematic to use in a complexly shaped environment such as an automobile vehicle, in which the echoes occur only rarely in the direction of the reflector, thus making the received signal unusable.

SUMMARY OF THE INVENTION

The object of the present invention is therefore to produce a device for detecting the intrusion of a body into a space such as the interior of an automobile vehicle, designed to effectively monitor all of this space while remaining inexpensive to manufacture and install.

This object of the invention, as well as others which will become apparent on reading the following description, are achieved with a detection device of the type described in the preamble of the present description, which is noteworthy in that it comprises means for scanning the space in question with the ultrasound beam out put by the transmitter and means for simultaneously moving the echo sensor so as to optimize the signal/noise ratio of the output of said sensor.

By virtue of the connection thus made between the movements of the transmitter and of the sensor, the device according to the invention produces a signal which allows all of the space to be monitored effectively, and economically, using a single transmitter/sensor pair.

Other features and advantages of the present invention will become apparent on reading the following description and on studying the appended drawing, in which the single FIGURE schematically represents an automobile vehicle equipped with the device according to the invention.

BRIEF DESCRIPTION OF THE DRAWINGS

This FIGURE schematically represents the wheels 21 to 24 of the vehicle 1 which is powered by an engine 3 placed in a compartment 4 separated from the interior 5 of the vehicle by a firebreak partition 6.

DESCRIPTION OF THE PREFERRED EMBODIMENTS

The device for detecting intrusion into this interior according to the invention comprises an ultrasound transmitter 7 and an echo sensor 8 which are mounted on a base 9, which is for example fixed in or on the interior roof and comprises electronic means (not shown) for processing the signal delivered by the sensor 8. These electronic means are essentially conventional and do not require a more detailed description. Also conventionally, these means control the triggering of an alarm (not shown), for example an audible one, when unauthorized intrusion, with forced entry for example, is detected during the processing of the signal delivered by the sensor.

The mechanism of this detection, during such intrusion, is well-known. When a moving body, such as a thief's arm, enters the ultrasound beam transmitted by the transmitter 7, the frequency of the ultrasound echoes detected by the sensor 8 is shifted by the Doppler effect from that of the transmitted beam because of the reflection of this beam from the moving body. The detection, by the in-vehicle electronic means, of this variation in frequency initiates the triggering of the alarm.

According to the present invention, the device comprises means 10 for scanning the space, or volume, of the interior 5 with the ultrasound beam output by the transmitter 7, and means 11 for simultaneously moving the sensor 8 so as to optimize the signal to noise ratio of the output of the sensor 8.

By virtue of this scanning of the interior, it will be understood that the part of this interior which is "illuminated" by the ultrasound beam may be much larger than that covered by a fixed beam, this being without resorting to more than one transmitter/sensor pair, which is economical.

It is, however, important that, depending on the position occupied by the transmitter 7 at a given time, the orientation of the sensor at this time, with respect to the transmitter, is such that the signal delivered by the sensor is indeed representative of the reflection of the beam leaving the transmitter 7 from a possible intrusive moving body. It should therefore be free, as far as is feasible, from components due to stray echoes from the walls or the seats of the interior, for example.

In order to achieve this, the aforementioned means 10 and 11 may assume the form of motorized rotary supports on which the transmitter 7 and the sensor 8 are respectively mounted. These motorized supports may assume any known shape making it possible to give the axis of the transmitted beam and the reception axis of the sensor given orientations, which are slaved to one another throughout their movement according to a predetermined function which optimizes the signal/noise ratio of the output of the sensor 8, as indicated above. This function may be established by computation or, more practically, by bench tests. Means for slaving the position of the motorized supports 10, 11, duly programmed to comply with the function that has been established, may be associated with the electronic means for processing the signal delivered by the sensor 8, in the base 9. The motorized supports 10, 11 incorporate means (not shown) for detecting their positions, for example their respective angular positions $\alpha$ and $\beta$. Signals representative of these positions are sent to the processing means and to the slaving means mentioned above in order to be taken into account in this processing, on the one hand, and in the implementation of the slaving function $\beta=f(\alpha)$ established in rig tests, on the other hand.

Advantageously, when this function is being established, the procedure adopted is such as to minimize the influence of the stray echoes, which operation moreover has a beneficial impact on the signal to noise ratio of the output of the sensor (8).

It is also possible to provide a system for controlling the movements of said motorized supports 10, 11 which can ensure that a particular region of the interior is monitored. The benefit of this arrangement is that certain parts of this interior are favored targets to thieves (glove box, car radio, steering wheel, parcel shelf, etc.). According to the invention, the monitoring of these parts may be enhanced, for example by scanning them more frequently with the ultrasound beam transmitted by the transmitter 7.

It can now be seen that the invention has a number of advantages, further to those already mentioned relating to the extended coverage of the volume of the interior by means which are economical to employ and the monitoring of particular regions. For example, the invention gives the vehicle designer greater freedom as to the fitting of the transmitter, the sensor and their base. It is therefore possible to make them blend in more smoothly for reasons of safety or aesthetics. Further, the device according to the invention can be adapted to different vehicles with no cost other than that of modifying the software which implements the slaving function $\beta=f(\alpha)$. The use of a moving sensor rather than a fixed one places fewer demands in terms of its performance, which allows its cost to be reduced.

Of course, the invention is not limited to the embodiment described and represented, which was given solely by way of example. The motorized rotary supports 10, 11 could thus be replaced by other conventional movement means, providing movement in translation, or in translation and rotation for example, as a function of some or other position slaving function to be implemented.

What is claimed is:

1. A device for detecting movement within a defined interior space, the device comprising:

a transmitter transmitting an ultrasound beam into a defined interior;

a sensor for sensing a reflection of the ultrasound beam and outputting an output signal representative of the reflected beam;

a processor connected to said sensor for processing the signal in order to detect movement in the interior space;

means for directing a transmitting direction of the ultrasound beam of said transmitter;

means for directing a sensing direction of said sensor for improving a signal to noise ratio of the output signal of said sensor, said means for directing the sensing direction formed to orient the sensing direction of said sensor in dependence of the transmitting direction, the dependence being adjusted to minimize an influence of strayed reflected beams on the signal output by said sensor; and a direction detector for detecting the transmitting direction and the sensing direction, respectively, said direction detector being connected to said transmitter and said sensor for slaving the sensing direction according to the sensing direction.

2. The device according to claim 1, wherein said processor is connected to said means for directing the sensing direction and to said means for directing the transmitting direction for enhanced monitoring of at least one particular region of said interior space.

3. The device according to claim 1, wherein said means for directing the transmitting direction moves said transmitter for directing the transmitting direction.

4. The device according to claims 1, wherein said means for directing the sensing direction moves said sensor for directing the sensing direction.

5. An automobile having a defined interior space, and the device according to claim 1 for detecting movement within the interior space of the automobile.

6. A device for detecting movement within a defined interior space, the device comprising:

a transmitter transmitting an ultrasound beam into a defined interior;

a sensor for sensing a reflection of the ultrasound beam and outputting an output signal representative of the reflected beam;

a processor connected to said sensor for processing the signal in order to detect movement in the interior space;

means for directing a transmitting direction of the ultrasound beam of said transmitter;

means for directing a sensing direction of said sensor for improving a signal to noise ratio of the output signal of said sensor, said means for directing the sensing direction formed to orient the sensing direction of said sensor in dependence of the transmitting direction; and a direction detector for detecting the transmitting direction and the sensing direction, respectively, said direction detector being connected to said transmitter and said sensor for slaving the sensing direction according to the sensing direction.

7. The device according to claim 6, wherein said processor is connected to said means for directing the sensing direction and to said means for directing the transmitting direction for enhanced monitoring of at least one particular region of said interior space.

8. The device according to claim 6, wherein said means for directing the transmitting direction moves said transmitter for directing the transmitting direction.

9. The device according to claims 6, wherein said means for directing the sensing direction moves said sensor for directing the sensing direction.

10. An automobile having a defined interior space, and the device according to claim 6 for detecting movement within the interior space of the automobile.

\* \* \* \* \*